(12) United States Patent
Yanagida et al.

(10) Patent No.: US 11,075,430 B2
(45) Date of Patent: Jul. 27, 2021

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Hiroki Shimoda, Mie (JP); Yoshinori Ito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 191 days.

(21) Appl. No.: 16/400,610

(22) Filed: May 1, 2019

(65) Prior Publication Data
US 2019/0355956 A1    Nov. 21, 2019

(30) Foreign Application Priority Data
May 21, 2018 (JP) .............................. JP2018-097203

(51) Int. Cl.
| | |
|---|---|
| *H01M 2/20* | (2006.01) |
| *H01M 50/502* | (2021.01) |
| *H01M 10/48* | (2006.01) |
| *H01R 11/28* | (2006.01) |
| *B60R 16/02* | (2006.01) |
| *H01M 10/42* | (2006.01) |
| *H01M 50/20* | (2021.01) |

(52) U.S. Cl.
CPC ....... *H01M 50/502* (2021.01); *B60R 16/0215* (2013.01); *H01M 10/4207* (2013.01); *H01M 10/482* (2013.01); *H01M 50/20* (2021.01); *H01R 11/288* (2013.01); *H01M 2220/20* (2013.01)

(58) Field of Classification Search
CPC .......... B60R 16/0215; H01M 10/4207; H01M 10/482; H01M 2220/20; H01M 2/1077; H01M 2/206; H01R 11/288; Y02E 60/10
See application file for complete search history.

(56) References Cited

U.S. PATENT DOCUMENTS

2013/0171495 A1    7/2013   Ogasawara et al.

FOREIGN PATENT DOCUMENTS

JP          5462813        1/2014

*Primary Examiner* — Victoria H Lynch
(74) *Attorney, Agent, or Firm* — Greenblum & Bernstein, P.L.C.

(57) ABSTRACT

An increase in the size of a wiring module is suppressed. A wiring module is for attachment to a power storage device group in which a plurality of power storage devices are arranged line up in a left-right direction. The wiring module includes: a plurality of voltage detection wires; and an insulating protector that includes a rear side routing portion in which the plurality of voltage detection wires are routed. The rear side routing portion includes a placement wall on which the plurality of voltage detection wires are placed, and a wire fixing portion that protrudes in a direction that intersects the placement wall, and to which the plurality of voltage detection wires are fixed using a binding member is provided in a region between left and right end portions of the insulating protector.

3 Claims, 7 Drawing Sheets

[FIG. 3]

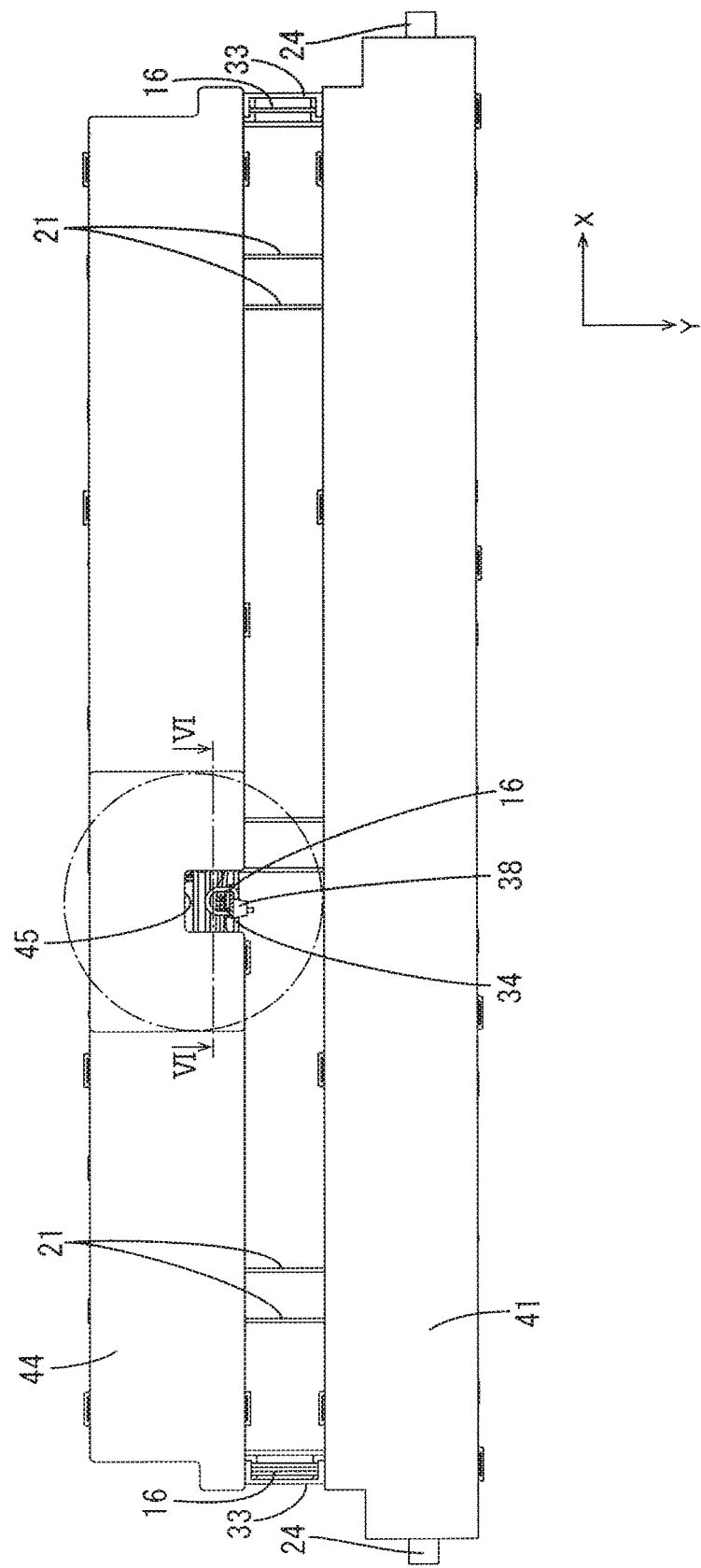

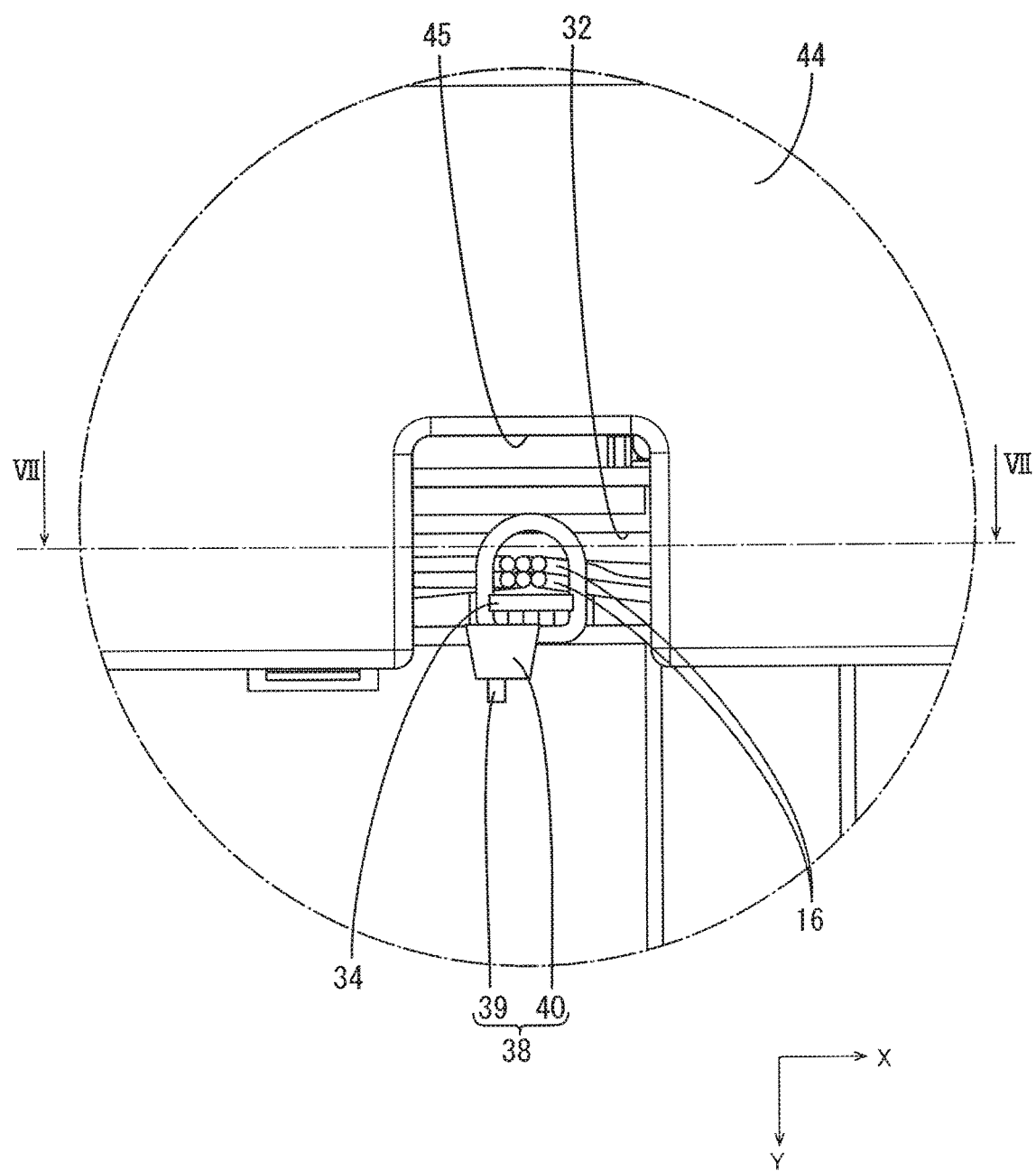

[FIG. 7]
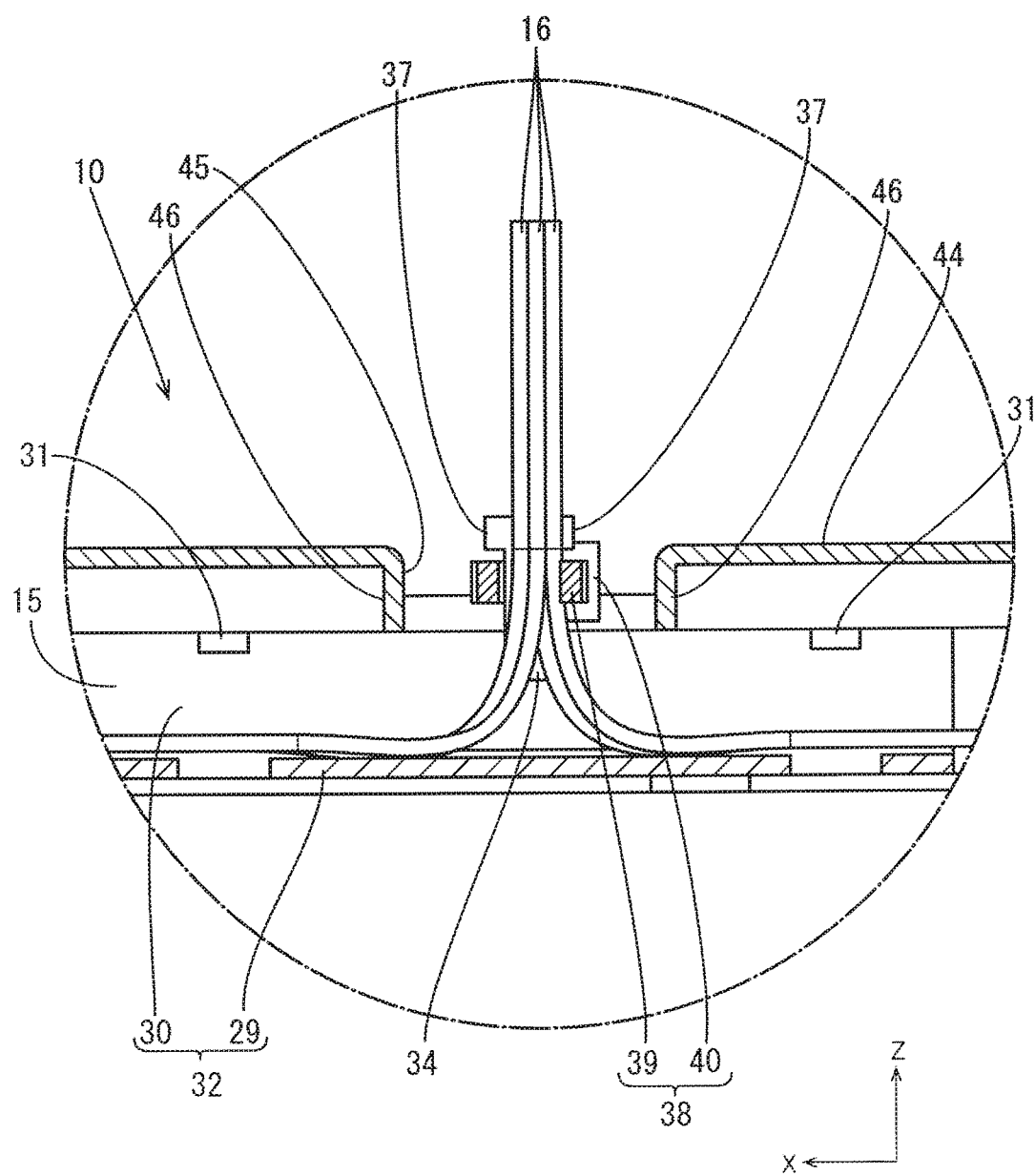

WIRING MODULE

TECHNICAL FIELD

The technology disclosed in the present specification relates to a wiring module.

BACKGROUND ART

The technology disclosed in JP 5462813B is known as a wiring module for attachment to a battery group in which a plurality of batteries are arranged side-by-side. This wiring module includes a plurality of bus bars that connect adjacent positive and negative electrodes of the plurality of batteries, a plurality of voltage detection terminals connected to the bus bars, a plurality of wires connected to the voltage detection terminals, a fixing portion that fixes the bus bars, and an insulating plate provided with a wiring path in which the wires are fixed.

An insulating plate has a wire lead-out portion that is formed by extending the bottom wall and the side walls of the wiring path so as to protrude from the insulating plate. A tongue piece protrudes from the bottom plate of the lead-out portion in a direction along which the bottom plate of the lead-out portion extends. A configuration is employed in which the wires are bundled and fixed to the tongue piece by wrapping a wrapping member around the tongue piece and the wires.

JP 5462813B is an example of related art.

SUMMARY OF THE INVENTION

With the above-described configuration, the tongue piece to which the wires are fixed is formed protruding from the bottom plate of the wiring path of the insulating plate in a direction along which the bottom plate extends. Thus, there is an issue in that the external size of the wiring module increases in the direction in which the wires are routed in the wiring path.

The technology disclosed in the present specification was achieved in light of the above-described circumstances, and it is an object of the present invention to provide a wiring module in which an increase in the size can be suppressed.

One aspect of the technology disclosed in the present specification is a wiring module that is to be attached to a power storage device group in which a plurality of power storage devices are arranged side-by-side in an arrangement direction, the wiring module including: a plurality of wires; and an insulating protector that includes a routing portion in which the plurality of wires are routed. The routing portion includes a placement wall on which the plurality of wires are placed, and a wire fixing portion that protrudes in a direction that intersects the placement wall, and to which the plurality of wires are fixed using a binding member is provided in a region between two end portions of the insulating protector in the arrangement direction.

With the above-described configuration, the wire fixing portion to which the plurality of wires are fixed protrudes in a direction intersecting the placement wall of the routing portion, and thus an increase in the size of the insulating protector in the direction in which the plurality of power storage devices are arranged can be suppressed.

The following embodiments are preferable as embodiments of the technology described in the present specification.

The routing portion includes a pair of side walls that extend intersecting the placement wall, and at least one side wall of the pair of side walls is provided with a restriction piece that protrudes toward another one of the side walls, and restricts the plurality of wires from coming out of the routing portion, and the wire fixing portion is provided in a vicinity of the restriction piece.

With the above-described configuration, when the plurality of wires routed along the placement wall in the routing portion are fixed to the wire fixing portion that is orthogonal to the placement wall, the plurality of wires are kept from coming out from the routing portion as a result of the plurality of wires abutting against the restriction piece provided in the vicinity of the wire fixing portion.

A cover is attached to the insulating protector, and the cover has a draw-out hole that extends through the cover, at a position corresponding to the wire fixing portion in a state where the cover is attached to the insulating protector, and an inner wall of the draw-out hole acts as a support wall that supports the plurality of wires in a case where the plurality of wires are subjected to a force acting in a direction that intersects a direction in which the wire fixing portion extends.

With the above-described configuration, the plurality of wires drawn out from the draw-out hole of the cover can be kept from bending sharply under a force acting in a direction that intersects the direction in which the wire fixing portion extends. Bending sharply means a state where a wire is bent at an angle of 90° or less. Note that the angle at which the wires bend may be an angle deemed to be substantially 90° without actually being 90°, and may be smaller than 91°.

With the technology disclosed in the present specification, an increase in the size of the wiring module can be suppressed.

BRIEF DESCRIPTION OF THE DRAWINGS

FIG. 5 shows a plan view of the wiring module;

FIG. 6 shows a partially enlarged plan view of an area within a region marked by a dash-dotted line in FIG. 5; and FIG. 7 shows a cross-sectional view taken along line VII-VII in FIG. 6.

EMBODIMENTS OF THE INVENTION

Embodiment 1

Figure 1:
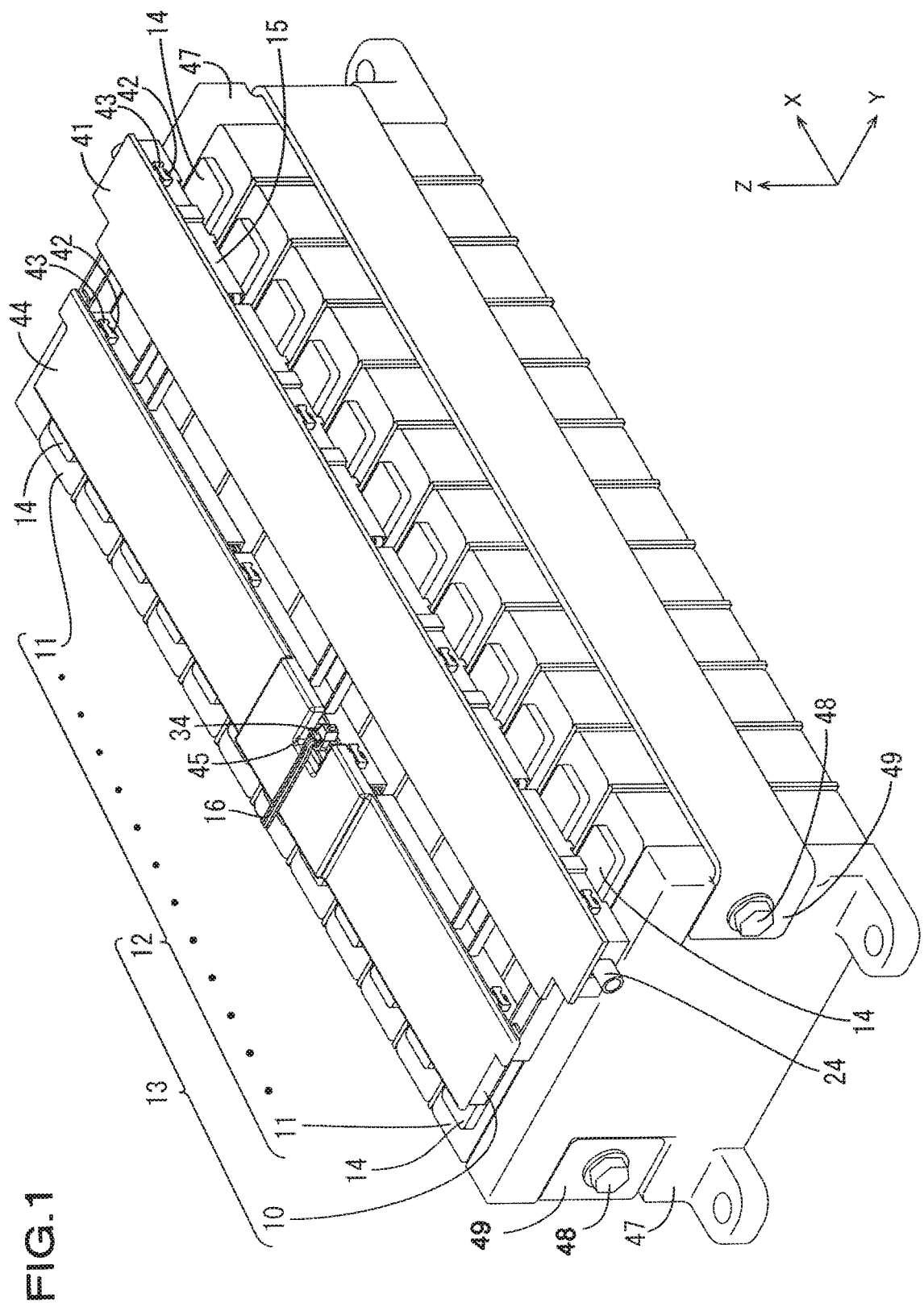
FIG. 1 shows a perspective view of a power storage module according to Embodiment 1.

Embodiment 1 of the technology disclosed in the present specification will be described with reference to FIGS. 1 to 7. A wiring module 10 according to the present embodiment constitutes a power storage module 13 by being attached to a power storage device group 12, which is a plurality of power storage devices (twelve in the present embodiment) 11 that are arranged side-by-side. The power storage module 13 is installed in a vehicle (not shown) such as an electric automobile or a hybrid automobile, and is used as a motive power source for driving the vehicle. In the description below, a description is given in which the Z direction is the upward direction, the Y direction is the forward direction, and the X direction is the leftward direction. Also, there may be cases where, for a plurality of the same members, a reference number is assigned to some of them and not assigned to the other members.

Power Storage Device 11

Each of the power storage devices 11 according to the present embodiment is a secondary battery. Power storage elements (not shown) are housed in the power storage devices 11. The power storage devices 11 have a substantially rectangular parallelepiped shape. A pair of electrode terminals 14 are provided on the upper surface of each power storage device 11 at positions close to the two end portions in the front-rear direction, respectively. One electrode terminal 14 is a positive terminal and the other is a negative terminal.

The power storage device group 12 is formed by arranging a plurality of pairs of power storage devices 11, in which two power storage devices 11 are arranged so that electrode terminals 14 with the same polarity are adjacent to each other, in the left-right direction (an example of an alignment direction). The pairs of power storage devices 11 are aligned such that the polarities of electrode terminals 14 are different in adjacent pairs of power storage devices 11. For example, in one pair of power storage devices 11, if the positive electrodes are arranged on the front side and the negative electrodes are arranged on the rear side, in another pair of power storage devices 11 adjacent to the said pair of power storage devices 11, the negative electrodes are arranged on the front side and the positive electrodes are arranged on the rear side.

A pair of end plates 47 are arranged on the left and right end portions of the power storage device group 12. The pair of end plates 47 are held between a pair of sandwiching plates 48 that are fixed to the front and rear side surfaces of the power storage device group 12 using bolts 49.

Wiring Module 10

As shown in FIG. 1, the wiring module 10 is attached to the upper surface of the power storage device group 12. Overall, the wiring module 10 is elongated in the left-right direction.

Figure 2:
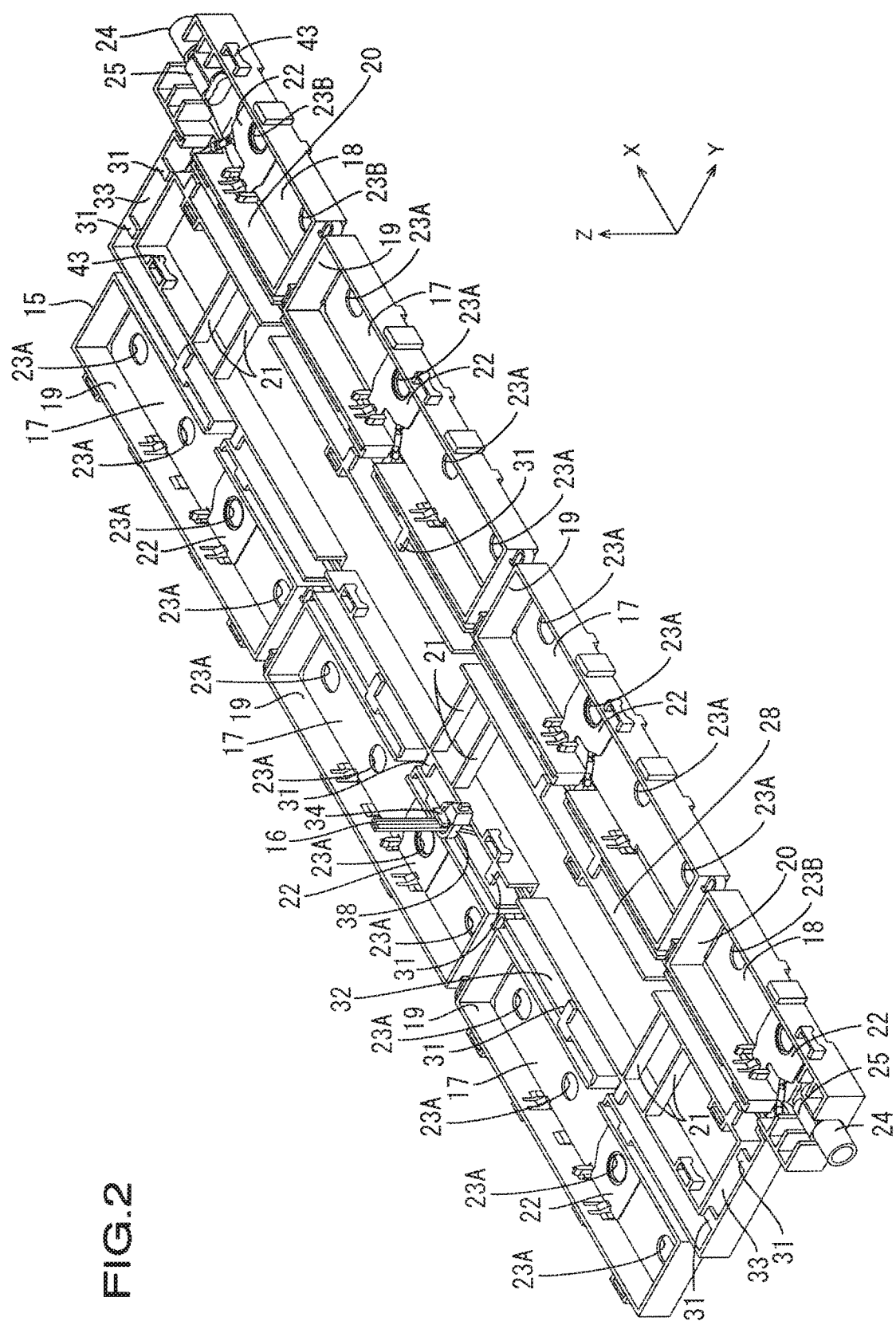
FIG. 2 shows a perspective view of a wiring module in a state where a front side cover and a rear side cover have been removed.

As shown in FIG. 2, the wiring module 10 includes an insulating protector 15 and a plurality of voltage detection wires 16 (examples of a wire) routed in the insulating protector 15.

Insulating Protector 15

The insulating protector 15 is made of a synthetic resin with insulating properties. The insulating protector 15 includes connection bus bars 17 that electrically connect adjacent pairs of power storage devices 11, and output bus bars 18 that are arranged on the left and right end portions of the power storage device group 12 and electrically connect the power storage device group 12 and an external circuit to each other.

At positions near the rear end portion of the insulating protector 15, a plurality (three in the present embodiment) of connection bus bar housing portions 19 are provided, into which a plurality (three in the present embodiment) of connection bus bars 17 are respectively housed. The connection bus bar housing portions 19 have a substantially rectangular shape elongated in the left-right direction when seen from above, and are formed to be slightly larger than the connection bus bars 17. The connection bus bar housing portions 19 have a box shape and are open upward.

At positions near the front end portion of the insulating protector 15, a plurality (two in the present embodiment) of connection bus bar housing portions 19 are provided, into which a plurality (two in the present embodiment) of connection bus bars 17 are respectively housed. Output bus bar housing portions 20 that house the output bus bars 18 are provided at positions that are near the front end portion and are on the left and right end portions of the insulating protector 15, respectively. The output bus bar housing portions 20 have a substantially rectangular shape elongated in the left-right direction when seen from above, and are formed to be slightly larger than the output bus bars 18. The output bus bar housing portions 20 have a box shape and are open upward.

Linking portions 21 that have a plate shape extending in the front-rear direction link the plurality of connection bus bar housing portions 19 provided at positions near the rear end portion of the insulating protector 15 to the plurality of connection bus bar housing portions 19 and the plurality of output bus bar housing portions 20 provided at positions near the front end portion of the insulating protector 15.

Figure 3:
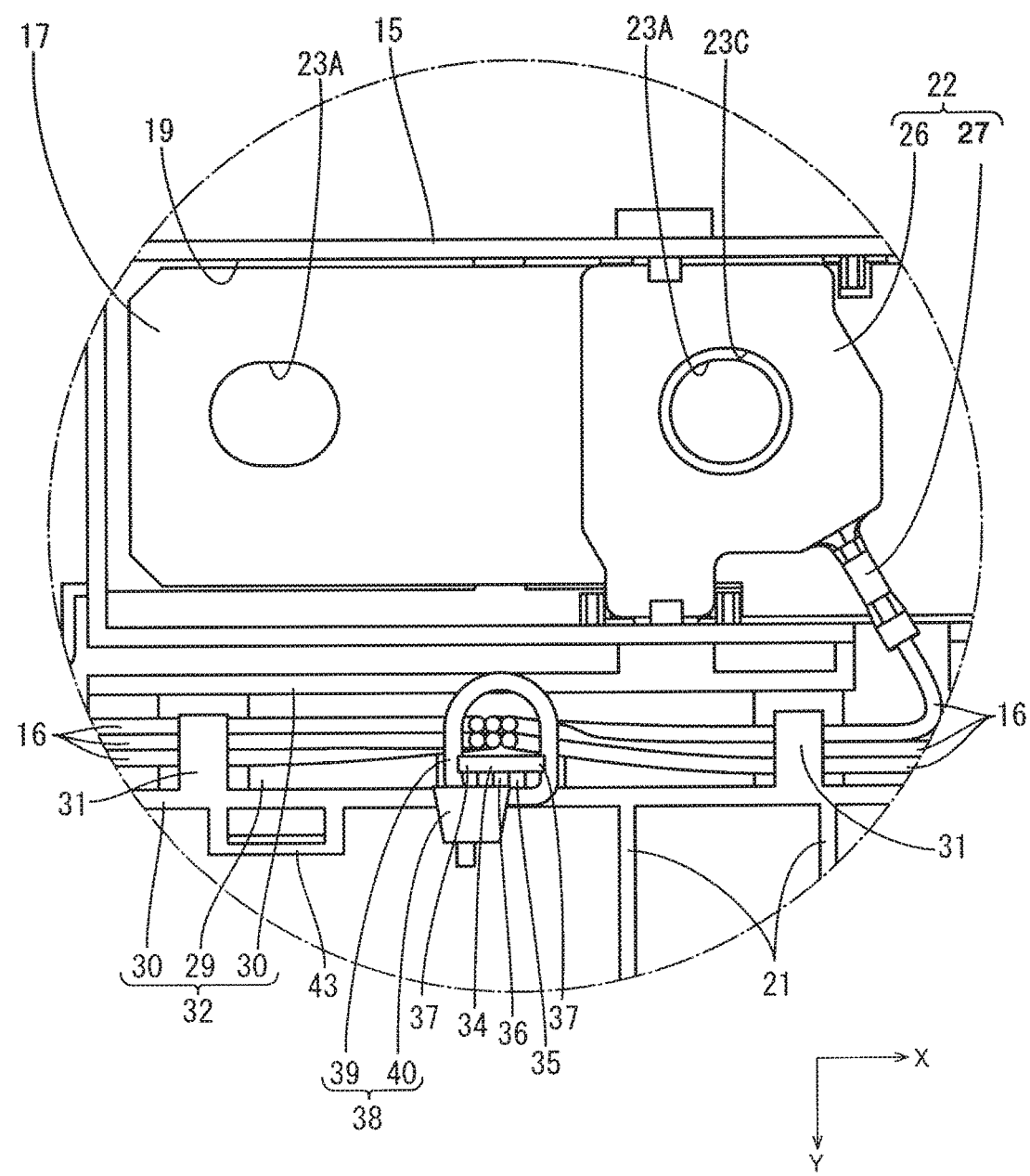
FIG. 3 shows a partially enlarged plan view of a state where voltage detection wires are fixed to a wire fixing portion by a binding member.

As shown in FIG. 3, in each connection bus bar housing portion 19, a connection bus bar 17 is housed in a state overlapped by a voltage detection terminal 22. Also, in each output bus bar housing portion 20, an output bus bar 18 is housed in a state overlapped by a voltage detection terminal 22.

Connection Bus Bar 17

As shown in FIG. 2, the connection bus bars 17 are formed by pressing a metal plate into a predetermined shape. As the material of the metal plate, copper, a copper alloy, iron, an iron alloy, aluminum, an aluminum alloy, or the like can be appropriately selected as needed. The connection bus bars 17 have an elongated shape in the left-right direction when seen from above. Each of the connection bus bars 17 is provided with a plurality (four in the present embodiment) of through-holes 23A that extend through the connection bus bars 17 and through which bolts (not shown) are passed. In a state where bolts are passed through the through-holes 23A, the electrode terminals 14 and the connection bus bars 17 are electrically connected to each other by screwing the bolts to screw holes formed in the electrode terminals 14.

Output Bus Bar 18

As shown in FIG. 2, in each of the output bus bars 18, a plurality (two in the present embodiment) of through-holes 23B, through which bolts (not shown) are to be passed, are formed extending through the output bus bar 18. At one end portion of each output bus bar 18, a barrel portion 25 is provided to which a wire 24, which is for electrically connecting an external circuit and the power storage device group 12 to each other, is connected. The wire 24 and the output bus bar 18 are electrically connected to each other by crimping the barrel portion 25 to the outer circumferential surface of the wire 24. The wire 24 connected to the output bus bar 18 disposed at the left end portion of the insulating protector 15 is drawn out to the left from the insulating protector 15. Also, the wire 24 connected to the output bus bar 18 disposed at the right end portion of the insulating protector 15 is drawn out to the right from the insulating protector 15. The configuration of the output bus bars 18 is otherwise the same as that of the above-described connection bus bars 17, and thus a redundant description is omitted.

Voltage Detection Terminal 22

As shown in FIG. 3, the voltage detection terminals 22 are formed by pressing a metal plate into a predetermined shape. As the material of the metal plate, copper, a copper alloy, iron, an iron alloy, aluminum, an aluminum alloy, or the like can be appropriately selected as needed. The voltage detection terminals 22 each include an electrode connection portion 26 that has a plate shape, and a barrel portion 27 extending from the electrode connection portion 26.

The electrode connection portion 26 is provided with a through-hole 23C through which a bolt is to be passed. The electrode connection portion 26 is sandwiched between the head of a bolt and the connection bus bar 17 or the output bus bar 18, and as a result, the voltage detection terminal 22 and the electrode terminal 14 are electrically connected to each other.

The barrel portion 27 is crimped to one end portion of a voltage detection wire 16 (an example of a wire). The other end portion of the voltage detection wire 16 is connected to an external connection device (not shown) such as an ECU (Electronic Control Unit).

Note that the ECU is equipped with a micro computer, elements, and the like, and employs a known configuration equipped with the functions of detecting the voltage, current, temperature, and the like of the power storage devices 11, and controlling charging, discharging, and the like of each of the power storage devices 11.

Front Side Routing Portion 28

As shown in FIG. 2, a front side routing portion 28 (an example of a routing portion) elongated in the left-right direction is provided rearward of the connection bus bar housing portions 19 and the output bus bar housing portions 20 that are provided at positions close to the front end portion of the insulating protector 15. The front side routing portion 28 is formed into a groove shape and includes a placement wall 29 onto which a plurality of voltage detection wires 16 are placed, and a pair of side walls 30 formed standing upright from the side edges of the placement wall 29. The placement wall 29 is elongated in the left-right direction.

At least one side wall 30 in the pair of side walls 30 is provided with restriction pieces 31 that protrude toward the other side wall 30. A gap large enough for a detection wire 16 to be passed through is provided between the leading end portions of the restriction pieces 31 and the other side wall 30. The voltage detection wires 16 are arranged in the front side routing portion 28 through this gap, and the voltage detection wires 16 are restricted from coming out of the front side routing portion 28 through this gap.

Rear Side Routing Portion 32

A rear side routing portion 32 (an example of a routing portion) extending in the left-right direction is provided forward of the connection bus bar housing portions 19 that are provided at positions near the rear end portion of the insulating protector 15. The rear side routing portion 32 is formed into a groove shape and includes a placement wall 29 onto which a plurality of voltage detection wires 16 are placed, and a pair of side walls 30 formed standing upright from the side edges of the placement wall 29. Restriction pieces 31 are provided on one of the pair of side walls 30. Apart from that described above, the configuration is similar to that of the front side routing portion 28 described above, and thus a redundant description is omitted.

Linking Routing Portion 33

The two end portions of the front side routing portion 28 and the two end portions of the rear side routing portion 32 are linked respectively to each other via linking routing portions 33 (an example of a routing portion) that extend in the front-rear direction. The linking routing portions 33 are each formed into a groove shape and include a placement wall 29 onto which a plurality of voltage detection wires 16 are placed, and a pair of side walls 30 formed standing upright from the side edges of the placement wall 29. The placement walls 29 are elongated extending in the front-back direction. The front side routing portion 28 and the rear side routing portion 32 are in communication with each other via the linking routing portions 33. Restriction pieces 31 are provided on one side wall 30 of each pair of side walls 30. Apart from the description above, the configuration is similar to that of the front side routing portion 28 described above, and a redundant description is omitted.

Wire Fixing Portion 34

Figure 4:
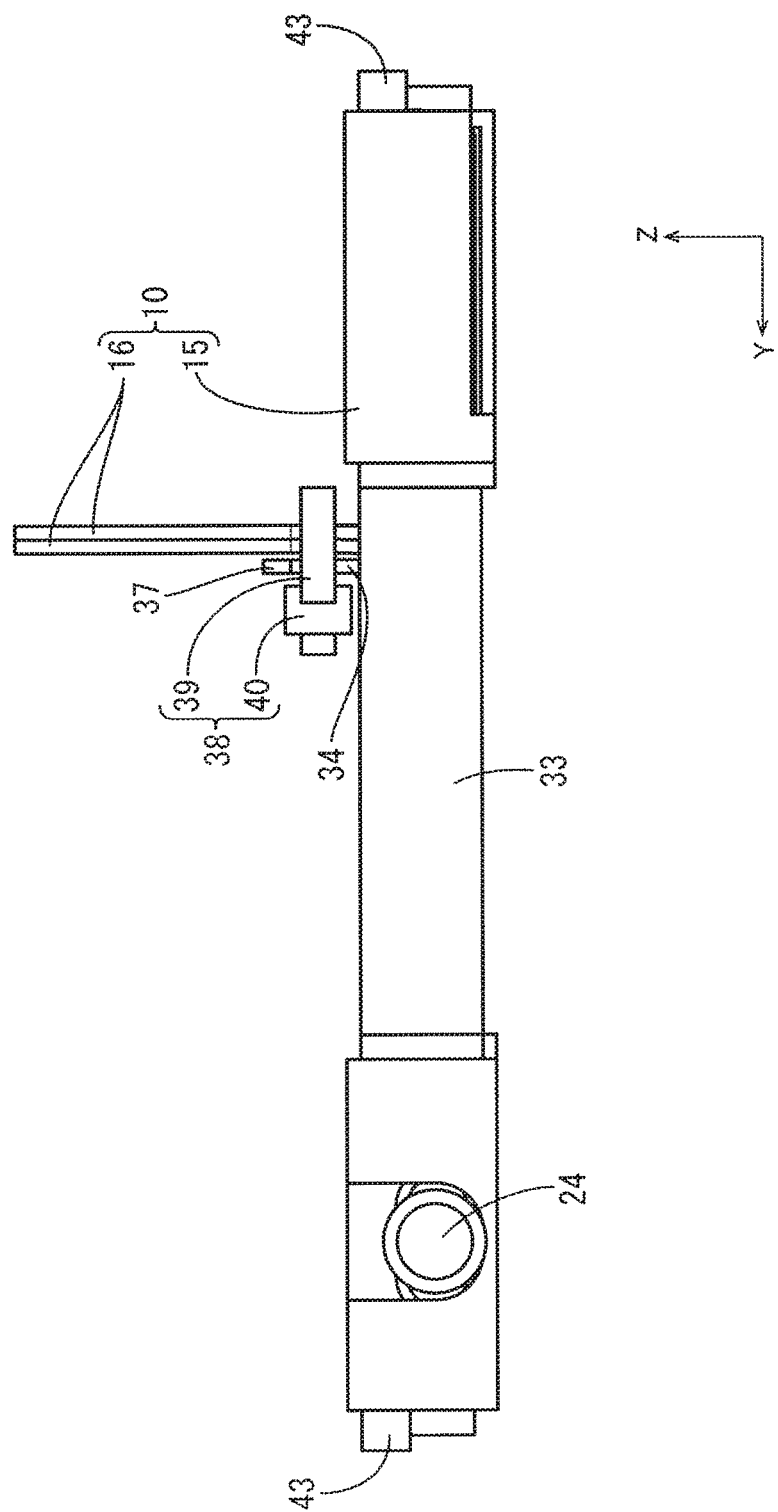
FIG. 4 shows a side view of the wiring module in a state where the front side cover and the rear side cover have been removed.

As shown in FIG. 7, in the region between the left and right end portions of the insulating protector 15, the rear side routing portion 32 is provided with a wire fixing portion 34 that protrudes in a direction that intersects the placement wall 29. In the present embodiment, the wire fixing portion 34 protrudes in a direction that is a direction away (upward) from the power storage device group 12 and is orthogonal to the placement wall 29. Note that, in the present specification, "orthogonal" refers to the angle formed by the wire fixing portion 34 and the placement wall 29 being in a range of 85° to 95°. The wire fixing portion 34 has a plate shape extending in the up-down direction. As shown in FIG. 3, the wire fixing portion 34 is formed extending upward from a rear end portion of an extension wall 35 that extends rearward from a region between the upper and lower end portions of the side wall 30 on the front side of the rear side routing portion 32. As shown in FIG. 4, the upper end portion of the wire fixing portion 34 extends to a position higher than the upper end portion of the side walls 30 of the rear side routing portion 32. The strength of the wire fixing portion 34 is increased by a reinforcement wall 36 that extends upward from the upper surface of the extension wall 35 and is connected to the front surface of the wire fixing portion 34. The upper end portion of the wire fixing portion 34 is provided with a pair of protruding portions 37 that protrude in the left and right directions.

In a state where the voltage detection wires 16 routed in the rear side routing portion 32 are bent upwards, a binding member 38 is wrapped around the voltage detection wires 16 and the wire fixing portion 34, thus fixing them to the wire fixing portion 34. The binding member 38 is wrapped at a position lower than the protruding portions 37 of the wire fixing portion 34, and thus the binding member 38 is kept from coming off upwards by the protruding portions 37. The binding member 38 is a commonly known member that includes a band portion 39 that can be wound around the wire fixing portion 34 and the voltage detection wires 16, and a fixing portion 40 that fixes this band portion 39.

The wire fixing portion 34 is provided in the rear side routing portion 32, at a position that is between two restriction pieces 31 arranged side-by-side and spaced apart from each other in the left-right direction, and is in the vicinity of restriction pieces 31. The wire fixing portion 34 is provided at the center position in the left-right direction between two restriction pieces 31.

Front Side Cover 41

As shown in FIG. 5, a front side cover 41 that covers the connection bus bar housing portions 19, the output bus bar housing portions 20, and the front side routing portion 28, is attached to the insulating protector 15 from above at a position near the front end portion thereof. The front side cover 41 is made from a synthetic resin with insulating properties, and is elongated in the left-right direction. The front side cover 41 is attached to the insulating protector 15, and as a result, the connection bus bars 17 housed in the connection bus bar housing portions 19 and the output bus bars 18 housed in the output bus bar housing portions 20 are electrically insulated.

As shown in FIG. 1, a configuration is employed in which the front side cover 41 and the insulating protector 15 are integrally attached when locking portions 42 provided on the front side cover 41 elastically lock with lock receiving portions 43 provided at positions corresponding to the locking portions 42 of the insulating protector 15.

Rear Side Cover 44

As shown in FIG. 5, a rear side cover 44 (example of a cover) that covers the connection bus bar housing portions 19 and the rear side routing portion 32 is attached to the insulating protector 15 from above at a position near the rear end portion thereof. The rear side cover 44 is made of a synthetic resin with insulating properties, and is elongated in the left-right direction. The rear side cover 44 is attached to the insulating protector 15, and as a result, the connection bus bars 17 housed in the connection bus bar housing portions 19 are electrically insulated.

As shown in FIG. 1, a configuration is employed in which the rear side cover 44 and the insulating protector 15 are integrally attached when locking portions 42 provided on the rear side cover 44 elastically lock with lock receiving portions 43 provided at positions corresponding to the locking portions 42 of the insulating protector 15.

As shown in FIG. 6, a draw-out hole 45 that extends through the rear side cover 44 is provided at a position corresponding to the wire fixing portion 34 in a state where the rear side cover 44 is attached to the insulating protector 15. The draw-out hole 45 is formed in a substantially rectangular shape as seen from above. The rear side routing portion 32 is exposed through this draw-out hole 45.

Also, the wire fixing portion 34 protrudes upward from the draw-out hole 45. The height position of the upper end portion of the wire fixing portion 34 is set somewhat higher than the upper surface of the rear side cover 44.

The voltage detection wires 16 drawn out from the draw-out hole 45 are bent rearward at a position above the draw-out hole 45, and extend rearward.

As shown in FIG. 7, the hole-edge portion of the draw-out hole 45 is designed as a support wall 46 that extends in the up-down direction. When the voltage detection wires 16 fixed to the wire fixing portion 34 are subjected to a force acting in a direction that intersects the direction in which the wire fixing portion 34 extends, the voltage detecting wires 16 abut against the support wall 46 and are supported by the support wall 46. In other words, the support wall 46 supports the voltage detection wires 16 in the front-rear direction or the left-right direction when a force is applied to the voltage direction wires 16 in the front-rear direction or the left-right direction.

Effects and Actions of the Embodiment

Next, effects and actions of the present embodiment will be described. The present embodiment is a wiring module 10 that is to be attached to a power storage device group 12 in which a plurality of power storage devices 11 are arranged side-by-side in the left-right direction, and includes a plurality of voltage detection wires 16, and an insulating protector 15 that has a rear side routing portion 32 in which the plurality of voltage detection wires 16 are routed. The rear side routing portion 32 includes a placement wall 29 on which the plurality of voltage detection wires 16 are placed, and a wire fixing portion 34 that protrudes in a direction that intersects the placement wall 29, and to which the voltage detection wires 16 are fixed using a binding member 38, is provided in the region between the left and right end portions of the insulating protector 15.

With the above-described configuration, the wire fixing portion 34 to which the voltage detection wires 16 are fixed protrudes in a direction that intersects the placement wall 29 of the rear side routing portion 32, and thus an increase in the size of the insulating protector 15 in the direction in which the plurality of power storage devices 11 are arranged can be suppressed.

Note that in the present embodiment, the wire fixing portion 34 and the placement wall 29 are orthogonal to each other. In the present specification, "orthogonal" means that the angle of the placement wall 29 relative to the extension direction of the wire fixing portion 34 is in a range of 85° to 95°.

Also, according to the present embodiment, the rear side routing portion 32 has a pair of side walls 30 that extend intersecting the placement wall 29, at least one side wall 30 of the pair of side walls 30 is provided with a restriction piece 31 that protrudes toward the other side wall 30 and restricts the plurality of voltage detection wires 16 from coming out of the rear side routing portion 32, and the wire fixing portion 34 is provided in the vicinity of the restriction piece 31.

With the above-described configuration, when the plurality of voltage detection wires 16 are routed along the placement wall 29 in the rear side routing portion 32 and fixed to the wire fixing portion 34 that is orthogonal to the placement wall 29, the plurality of voltage detection wires 16 are kept from coming out of the rear side routing portion 32 due to the plurality of voltage detection wires 16 abutting against the restriction piece 31 provided in the vicinity of the wire fixing portion 34.

Also, according to the present embodiment, the rear side cover 44 that covers the rear side routing portion 32 is configured to be attached to the rear end portion of the insulating protector 15, and the rear side cover 44 includes a draw-out hole 45 that extends through the rear side cover 44, at a position that corresponds to the wire fixing portion 34 in a state where it is attached to the insulating protector 15. The inner wall of the draw-out hole 45 acts as a support wall 46 that supports the plurality of voltage detection wires 16 in a case where the plurality of voltage detection wires 16 are subjected to a force acting in a direction that intersects the direction in which the wire fixing portion 34 extends.

With the above-described configuration, the plurality of voltage detection wires 16 drawn out from the draw-out hole 45 of the rear side cover 44 can be kept from bending sharply under a force acting in a direction that intersects the direction in which the wire fixing portion 34 extends. "Bending sharply" means wires bending at an angle of 90° or less. Note that the angle at which the voltage detection wires 16 bend may be an angle deemed to be substantially 90° without actually being 90°, and may be smaller than 91°.

Other Embodiments

The present invention is not limited to the embodiment described in the above description with reference to the drawings, and embodiments such as the following also fall within the technical scope of the present invention, for example.

(1) In the present embodiment, a configuration was employed in which one wire fixing portion 34 is formed in one wiring module 10, but there is no limitation to this, and a configuration may be employed in which a plurality of wire fixing portions 34 are formed in one wiring module 10.

(2) In the present embodiment, a configuration was employed in which the wire fixing portion 34 is provided in the rear side routing portion 32, but there is no limitation to this. The wire fixing portion 34 may be provided in the front side routing portion 28 or the linking routing portion 33, and can be provided at any position in the insulating protector 15 as needed.

(3) In the present embodiment, the wires are described as being the voltage detection wires 16 that detect the voltage of the power storage devices 11, but there is no limitation to this. The wires may be wires that detect the temperature of the power storage devices 11. Also, the plurality of wires do not necessarily have to be connected to the power storage devices 11, and, for example, a plurality of wires connected to a device different to the power storage module 13 may be routed in the wiring module 10.

(4) The power storage device 11 can be a capacitor or a condenser.

(5) In the present embodiment, a configuration is employed in which a restriction piece protrudes from one side wall toward another side wall, but there is no limitation to this. A configuration may be employed in which a pair of restriction pieces are respectively provided on a pair of side walls and each protrude toward the opposing side wall, and a gap through which the wires can be passed is provided between the leading end portions of the pair of restriction pieces.

(6) Either one or both of the front side cover 41 and the rear side cover 44 may be omitted.

(7) The wire fixing portion 34 may be formed protruding upward from the placement wall 29.

(8) Adhesive tape may also be used as the binding member 38.

(9) In the present embodiment, the draw-out hole 45 has a substantially rectangular shape when seen from above, but there is no limitation to this. The draw-out hole 45 may have any shape such as a circular shape, an oval shape, a race track shape, a triangular shape, and a polygonal shape, as needed.

(10) In the present embodiment, the angle formed between the wire fixing portion 34 and the placement wall 29 is 85° to 95°, but there is no limitation to this. For example, the angle may be 45° obliquely upward relative to the placement wall 29, or set to any angle.

LIST OF REFERENCE NUMERALS

10: Wiring module
11: Power storage device
12: Power storage device group
15: Insulating protector
16: Voltage detection wire
29: Placement wall
30: Side wall
31: Restriction piece
32: Rear side routing portion
34: Wire fixing portion
38: Binding member
44: Rear side cover
45: Draw-out hole
46: Support wall

What is claimed is:

1. A wiring module configured to be attached to a power storage device group in which a plurality of power storage devices are arranged side-by-side in an arrangement direction, the wiring module comprising:
   a plurality of wires; and
   an insulating protector that includes a routing portion in which the plurality of wires are routed,
   wherein the routing portion includes a placement wall on which the plurality of wires are placed, and a wire fixing portion to which the plurality of wires are fixed using a binding member protrudes in a direction that intersects the placement wall, in a region between two end portions of the insulating protector in the arrangement direction.

2. A wiring module configured to be attached to a power storage device group in which a plurality of power storage devices are arranged side-by-side in an arrangement direction, the wiring module comprising:
   a plurality of wires; and
   an insulating protector that includes a routing portion in which the plurality of wires are routed,
   wherein the routing portion includes a placement wall on which the plurality of wires are placed, and a wire fixing portion to which the plurality of wires are fixed using a binding member protrudes in a direction that intersects the placement wall, in a region between two end portions of the insulating protector in the arrangement direction,
   wherein the routing portion includes a pair of side walls that extend intersecting the placement wall, and at least one side wall of the pair of side walls includes a restriction piece that protrudes toward another one of the side walls, and restricts the plurality of wires from coming out of the routing portion, and
   the wire fixing portion is provided in a vicinity of the restriction piece.

3. A wiring module configured to be attached to a power storage device group in which a plurality of power storage devices are arranged side-by-side in an arrangement direction, the wiring module comprising:
   a plurality of wires; and
   an insulating protector that includes a routing portion in which the plurality of wires are routed,
   wherein the routing portion includes a placement wall on which the plurality of wires are placed, and a wire fixing portion to which the plurality of wires are fixed using a binding member protrudes in a direction that intersects the placement wall, in a region between two end portions of the insulating protector in the arrangement direction,
   wherein a cover is attached to the insulating protector,
   the cover has a draw-out hole that extends through the cover, at a position corresponding to the wire fixing portion in a condition in which the cover is attached to the insulating protector, and
   an inner wall of the draw-out hole acts as a support wall that supports the plurality of wires in a condition in which the plurality of wires are subjected to a force acting in a direction that intersects a direction in which the wire fixing portion extends.

* * * * *